United States Patent [19]

Close et al.

[11] Patent Number: 4,903,245

[45] Date of Patent: Feb. 20, 1990

[54] DOWNHOLE VIBRATION MONITORING OF A DRILLSTRING

[75] Inventors: David A. Close, Houston; Steven C. Owens, Katy; Trevor K. C. Pugh, Houston, all of Tex.

[73] Assignee: Exploration Logging, Inc., Sacramento, Calif.

[21] Appl. No.: 166,897

[22] Filed: Mar. 11, 1988

[51] Int. Cl.$^4$ .............................................. G01V 1/40
[52] U.S. Cl. ..................................... 367/81; 340/853; 340/857; 364/422
[58] Field of Search .......................... 367/81, 82, 83; 340/853, 854, 856, 857; 364/422; 73/151, 152

[56] References Cited

U.S. PATENT DOCUMENTS

| | | | |
|---|---|---|---|
| 3,791,043 | 2/1974 | Russell | 33/312 |
| 3,862,499 | 1/1975 | Isham et al. | 33/312 |
| 3,905,010 | 9/1975 | Fitzpatrick . | |
| 3,935,642 | 2/1976 | Russell | 33/302 |
| 3,935,643 | 2/1976 | Russell et al. | 33/312 |
| 4,013,945 | 3/1977 | Grosso | 324/208 |
| 4,047,430 | 9/1977 | Angehrn | 73/151 |
| 4,083,117 | 4/1978 | Russell et al. | 33/313 |
| 4,109,521 | 8/1978 | Youmans | 73/151 |
| 4,150,568 | 4/1979 | Berger et al. | 73/151 |
| 4,216,536 | 8/1980 | More | 367/83 |
| 4,359,899 | 11/1982 | Claycomb | 73/151 |
| 4,445,578 | 5/1984 | Millheim | 73/151 |
| 4,468,665 | 8/1984 | Thawley et al. | 340/856 |
| 4,562,560 | 12/1985 | Kamp | 367/83 |
| 4,695,957 | 9/1987 | Peltier | 364/422 |
| 4,715,022 | 12/1987 | Yeo | 367/83 |
| 4,715,451 | 12/1987 | Bseisu et al. | 175/40 |
| 4,718,011 | 1/1988 | Patterson, Jr. | 364/422 |
| 4,733,232 | 3/1988 | Grosso | 340/861 |
| 4,747,303 | 5/1988 | Fontenot | 73/152 |
| 4,763,258 | 8/1988 | Engelder | 364/422 |
| 4,763,259 | 8/1988 | Delatorre et al. | 364/422 |
| 4,794,534 | 12/1988 | Millheim | 364/420 |
| 4,802,143 | 1/1989 | Smith . | |

FOREIGN PATENT DOCUMENTS 1330191 9/1973 United Kingdom .
2161276 1/1986 United Kingdom .
2179736 3/1987 United Kingdom .
2195773 4/1988 United Kingdom .

OTHER PUBLICATIONS

Denison, E. B., "Shell's High-Data-Rate Drilling Telemetry System Passes First Test", *The Oil & Gas Journal*, 6/13/1977, pp. 63–66 (USA).
Dareing, D. W., "Drill Collar Length is a Major Factor in Vibration Control", SPE 11228, Society of Petroleum Engineers of AIME, 9/82 (New Orleans, LA).
Dareing, D. W., "Rotary Speed, Drill Collars Control Drillstring Bounce", *Oil & Gas Journal*, 6/6/83, pp. 63–68 (USA).
Baird, J. A., et al., "Geodyn: A Geological Formation/-Drillstring Dynamics Computer Program", SPE 13023, SPE 59th Annual Technical Conference and Exhibition, 9/1984 (Houston, TX).
Dunayevsky, V. A., et al., "Onset of Drillstring Precession in a Directional Borehole", SPE 13027, SPE of AIME, 9/1984 (Houston, TX).
Honeybourne, W., "Formation MWD Benefits Evaluation and Efficiency", *Oil & Gas Journal*, 2/1985 (USA).
(List continued on next page.)

*Primary Examiner*—Thomas H. Tarcza
*Assistant Examiner*—Ian J. Lobo
*Attorney, Agent, or Firm*—Christie, Parker & Hale

[57] ABSTRACT

Apparatus for monitoring vibration of a bottom hole assembly used to drill a well includes at least one accelerometer mounted in the bottom hole assembly to generate data in the form of electrical signals corresponding to the acceleration experienced by the assembly. The computer in the assembly is programmed to collect data from the accelerometer and compute magnitude of the assembly acceleration. Means are provided for selecting from the collected data a value which exceeds a preset level. In one form, when the collected data has a value above a preset level, an alarm signal is sent to the surface so corrective measures can be taken to prevent damage to downhole equipment.

12 Claims, 4 Drawing Sheets

OTHER PUBLICATIONS

Mitchell, R. F., et al., "Lateral Vibration: The Key to BHA Failure Analysis", *World Oil*, 3/1985, pp. 101–104 & 106 (USA).

Baird, J. S., et al., "GEODYN2: A Bottomhole Assembly/Geological Formation Dynamic Interaction Computer Program", SPE 14328, Society of Petrolem Engineers 60th Annual Technical Conference, 9/1985 (Las Vegas, NV).

Dunayevsky, V. A., et al., "Dynamic Stability of Drillstrings Under Fluctuating Weights-on-Bit", SPE 14329, Society of Petroleum Engineers 60th Annual Technical Conference, 9/1985 (Las Vegas, NV).

Wolf, S. F., et al., "Field Measurements of Downhole Drillstring Vibrations", SPE 14330, Society of Petroleum Engineers 60th Annual Technical Conference, 9/1985 (Las Vegas, NV).

Besaisow, A. A., et al., "A Study of Excitation Mechanisms and Resonances Inducing BHA Vibrations", SPE 15560, Society of Petroleum Engineers 61st Annual Technical Conference, 10/1986 (New Orleans, LA).

Burgess, T. M., et al., "Improving BHA Tool Reliability with Drillstring Vibration Models: Field Experience and Limitations", SPE/IADC 16109, SPE/IADC Drilling Conference, 3/1987 (New Orleans, LA).

Allen, M. B., "BHA Lateral Vibrations", Case Studies and Evaluation of Important Parameters, SPE/IADC 16110, SPE/IADC Drilling Conference, 3/1987 (New Orleans, LA).

Fox, C., "One Megabyte Memory Offers Downhole Sensor Options", *Offshore Engineer*, 4/1987, pp. 88–89 (USA).

Close, D. A., et al., "Measurement of BHA Vibration Using MWD", IADC/SPE 17273, IADC/SPE Drilling Conference, 2/1988 (Dallas, TX).

Chin, W. C., "Fatal Tubular Bending Motions Difficult to Detect Uphole", *Offshore*, 4/1988, pp. 32–36 (USA).

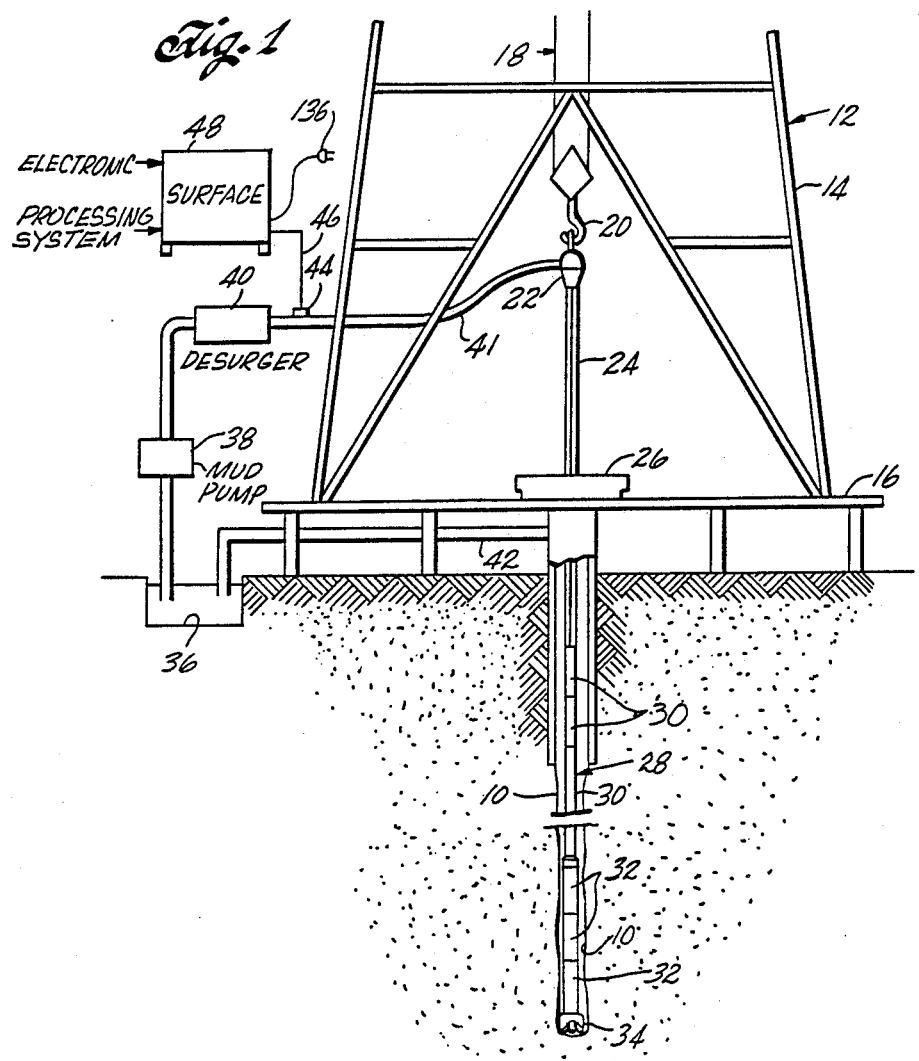

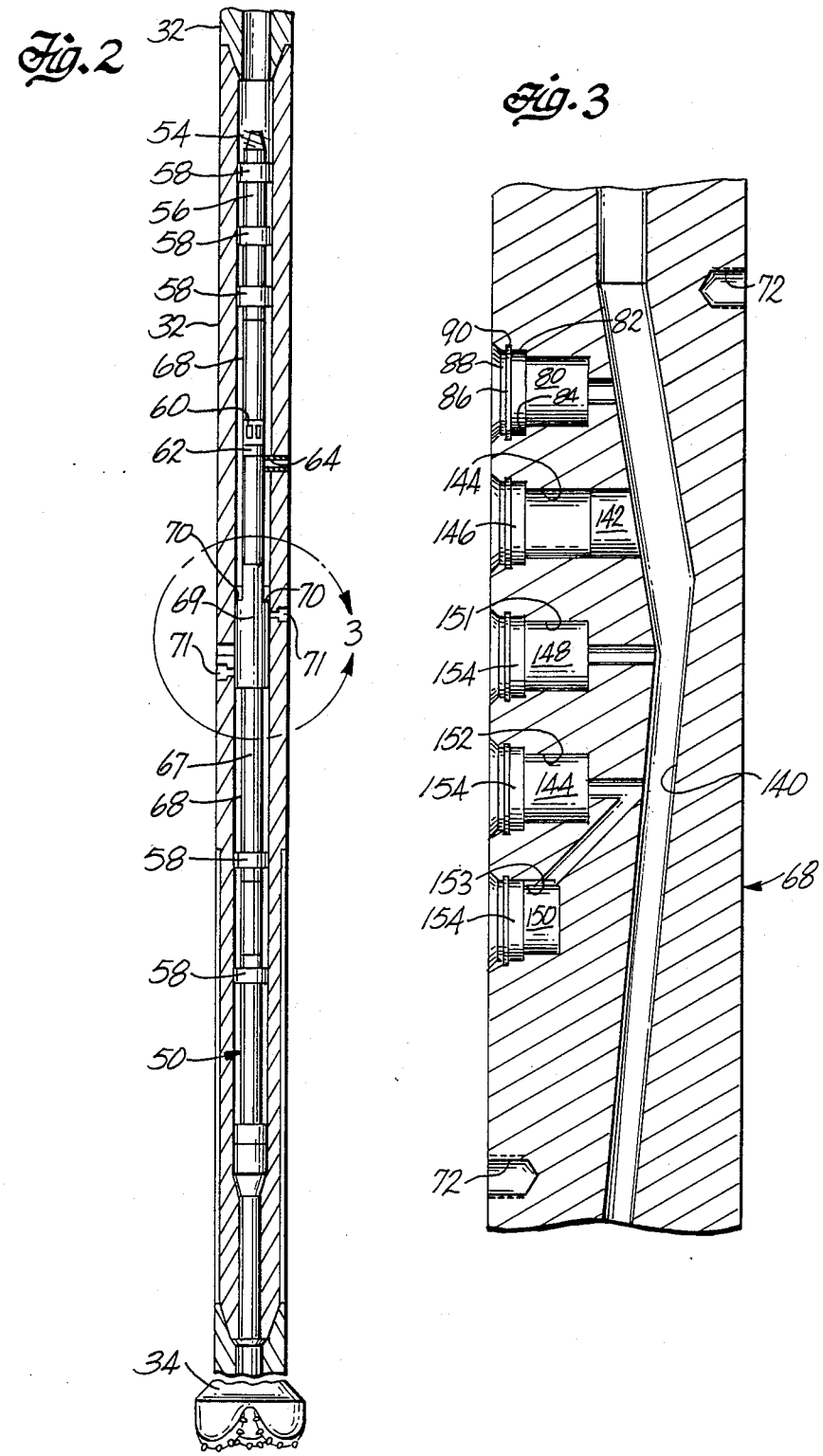

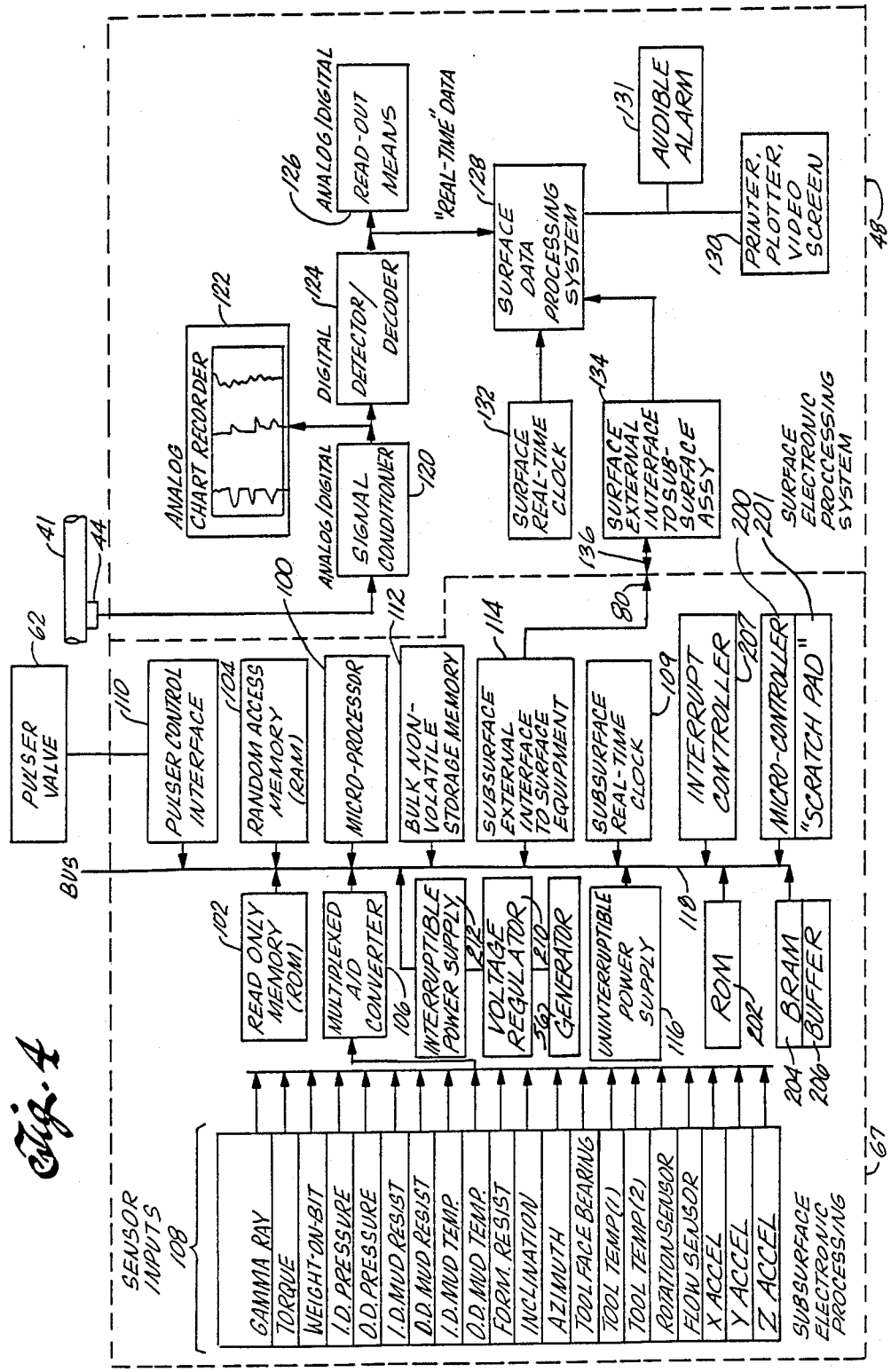

DOWNHOLE VIBRATION MONITORING OF A DRILLSTRING

BACKGROUND OF THE INVENTION

1. Field of the Invention

This invention relates to monitoring drillstring vibration during the drilling of a well.

2. The Prior Art

Drill pipe and bottom hole assemblies in a drillstring experience a wide range of vibration during drilling operations. Excessive vibrations lead to failure of components in the drillstring. This is especially true for the more vibration-sensitive components employed in measuring-while-drilling tools, such as are described in U.S. Pat. No. 4,216,536 to More (1980). Even moderate vibration, when sustained for extended periods of time, can decrease the useful life of relatively rugged components, such as drill bit bearings. Vibration damage increases drilling costs due to loss of rig time, equipment replacement, and, in the worst case, loss of the hole.

For many years, the drilling industry has sought ways to predict, monitor, and control drillstring vibration to avoid partial or catastrophic failure of components in the drillstring. For example, see the Dareing et al paper, entitled "Longitudinal And Angular Drillstring Vibrations With Damping" (ASME Paper 68-Pet- Sept. 30 1968), which presents an analysis of drillstring vibration that included all parts of the drillstrigg from the bit to the elevators. Dareing's later Paper No. SPE 11228, entitled "Drill Collar Length Is A Major Factor In Vibration Control", presented to the Society of Petroleum Engineers of AIME in 1982, emphasizes that the drillstring bottom hole assembly (which includes the drill collars) is the major factor which determines vibration, and suggests equations for calculating critical speeds for various drill collar lengths.

The industry has used critical rotary speed formulae provided in API RP 7G since 1970 to try to prevent unacceptable vibration in the drillstring. However, recent work suggests that rotary speeds which induce vibration in bottom hole assemblies cannot be accurately predicted using the API RP 7G equations.

Wolf et al presented Paper No. SPE 14330, entitled "Field Measurements Of Downhole Drillstring Vibrations", to the Society of Petroleum Engineers in 1985 reporting the use of a downhole sensor string and a hardwire telemetry link (described in Denison's article entitled "Shell's High- Data-Rate Drilling Telemetry System Passes First Field Test", in the June 13, 1977, issue of *Oil and Gas Journal*, p. 63) through the drillstring to transmit downhole drillstring vibration data to the surface. Although the hardwire telemetry link provides immediate (i.e., real-time) downhole vibration data to the surface, the hardwire system is depth-limited because of its expense, and it disrupts drilling operations as drill pipe sections are added to, or removed from, the drillstring during trips into or out of the well.

Reliable control of bottom hole assembly vibration requires collection and analysis of enormous amounts of field data, which have not been economically available before this invention.

SUMMARY OF THE INVENTION

This invention provides economical apparatus and methods for collecting and processing unlimited amounts of drillstring vibration data. In one form of the invention, the more important parts of the data are stored in a bottom hole assembly for later retrieval and detailed analysis of critical drillstring vibration.

In another form, the invention protects downhole components, such as drill pipe, drill collars, drill bit bearings, and especially the more delicate downhole devices used in measuring-while-drilling systems by monitoring and analyzing accelerometer readings taken downhole. Detected detrimental acceleration (vibration) data are encoded and telemetered immediately to the surface so that corrective action can be taken by altering the drilling conditions (e.g., rotary speed, weight-on-bit, and the like) until acceptable downhole conditions prevail, thus extending the life of components in the drillstring.

The industry has used equations and computer modeling to try to predict combinations of drillstring and borehole parameters which could lead to unacceptable vibration. Using these models has achieved only limited success in identifying undesirable operating conditions. The field data provided by this invention can prevent catastrophic failure during drilling, and also permit prior computer models to be improved, and provide better insight into actual vibration spectra.

In brief, the invention includes a downhole computer and recording system to collect, process, and store in a bottom hole assembly selected drillstring vibration data acquired under drilling conditions. At least one accelerometer mounted in the bottom hole assembly generates data in the form of electrical signals corresponding to acceleration experienced by the drillstring bottom hole assembly, which includes the usual drill bit, drill collars, crossover subs, stabilizers, and the like, and equipment mounted within the assembly. The computer, including a real-time clock, is mounted in the assembly and programmed to collect data from the accelerometer at a rate of at least 10 times per second, and to compute magnitude of the assembly acceleration versus real-time. Preferably, the computer also collects and stores data from which acceleration frequency can be determined. A nonvolatile bulk storage memory is mounted in the bottom hole assembly for storing electronic data. In one form, nonvolaiility of the memory is ensured by a battery which provides a noninterruptible power supply to the memory. The computer is also programmed to select from the collected data those values which exceed a critical level, and to store the selected values in the memory. Means are also provided for recovering the stored data from the memory when the bottom hole assembly is moved to the surface.

The preferred form of the invention includes three orthogonally mounted accelerometers in the bottom hole assembly to measure acceleration in three mutually perpendicular directions. A magnetometer is also included in the bottom hole assembly for measuring rpm and rotational acceleration. For a more complete analysis of downhole vibrations, the bottom hole assembly includes sensors for detecting weight-on-bit, torque, and bending movement imposed on the bottom hole assembly.

The preferred form of the invention also includes a buffer section in the nonvolatile bulk storage memory so that selected data can be stored in the buffer, compared with data previously stored in the memory, and added to, or substituted for, previously-stored data which indicates lower acceleration values than those indicated by the buffered data. In this way, downhole acceleration may be continuously monitored, temporarily stored, and then either recorded permanently or discarded, depending on its value relative to other data already stored.

In one form, frames (a frame is a digitized sequence of sensor data taken over a specific time interval) of the most significant or severe vibrations are detected and stored in accordance with significance defined by a first order averaging algorithm of the following expression, in which a frame consists of n data points having instantaneous values of acceleration (Ai) and a mean value of acceleration (A):

$$\text{Vibration Severity} = \Sigma \frac{|A_i - \overline{A}|}{n}$$

In another form of the invention, the downhole computer is programmed to detect an encoded sequence of drilling fluid flow rates and rotational speeds. After the downhole detection of this sequence and a preset time delay, the computer collects and stores a frame of data in the memory. This allows the drilling operator to record the magnitude and frequency of vibration of the bottom hole assembly for different controlled combinations of specific drilling conditions. This method provides detailed information (both frequency and magnitude) of acceleration variations versus time during a selected interval for a bit run.

In another form of the invention, to collect information about vibration levels during an entire bit run, the downhole computer employs a root mean square or a root mean cube algorithm, or both, to provide a depth or time account of average vibration levels experienced during a bit run for all frames processed. The root mean square algorithm is expressed as follows:

$$RMS = \Sigma \left[ \frac{|A_i - \overline{A}|^2}{n} \right]^{1/2}$$

The root mean cube algorithm is expressed as follows:

$$RMC = \Sigma \left[ \frac{|A_i - \overline{A}|^3}{n} \right]^{1/3}$$

The values calculated by the RMS and RMC algorithms are stored in the memory, thus allowing a digitally averaged, fast-sampled vibration log for all three axes of the bottom hole assembly during an entire bit run. The RMS and RMC algorithms provide magnitude information with respect to accelerations experienced by the bottom hole assembly, but no frequency information.

BRIEF DESCRIPTION OF THE DRAWING

FIG. 1 shows a system for simultaneously drilling and monitoring downhole vibration of a drillstring;

FIG. 2 is a longitudinal cross section of the bottom hole assembly equipped with apparatus in accordance with this invention;

FIG. 3 is an enlarged view taken in the area of arrows 3 of FIG. 2;

FIG. 4 is a schematic block diagram of the downhole electronic processing system and the surface electronic processing system.

DESCRIPTION OF SPECIFIC EMBODIMENTS

Figure 5:
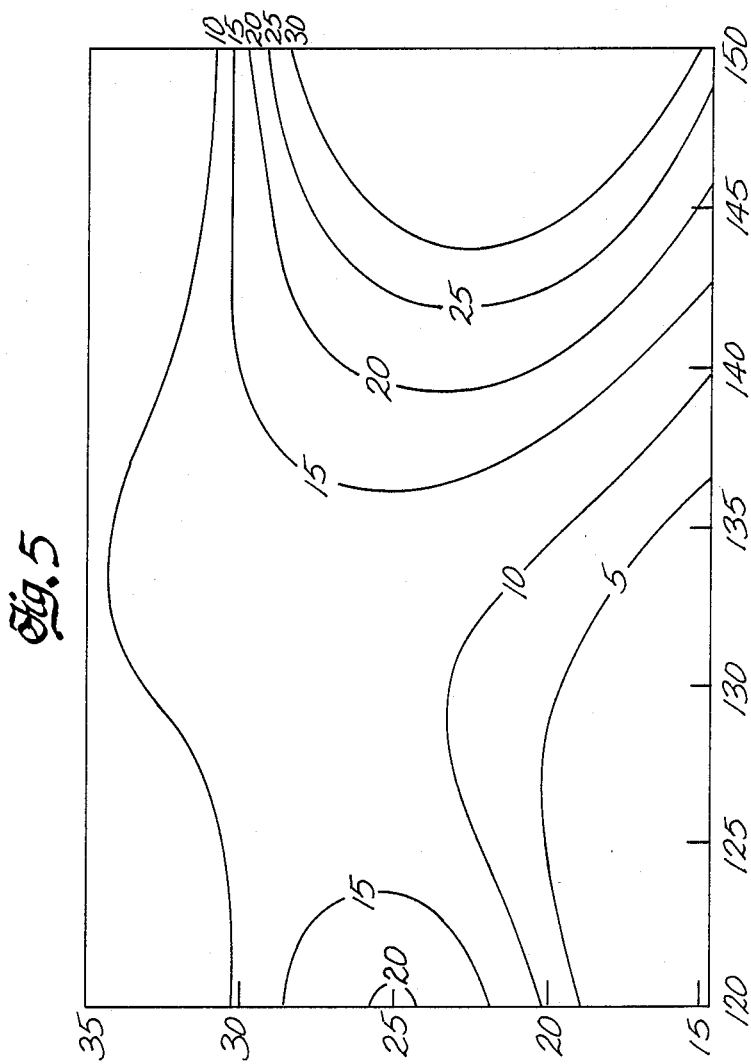
FIG. 5 is a plot of measured weight-on-bit, drillstring rotary speed (RPM), and lateral acceleration values while drilling 289 feet in a Gulf of Mexico well at a drilling depth of about 12,000 feet.

The preferred embodiments of the invention are described in detail below as being used with a measuring-while-drilling system, which can measure, record, and transmit many different values while drilling. Preferably, pressure pulses are transmitted through the drilling liquid used in normal drilling operations to send information from the vicinity of the drill bit to the surface of the earth. As the well is drilled, at least one downhole condition within the well is sensed, and a signal, usually analog, is generated to represent the sensed condition. The analog signal is converted to a digital signal, which is used to alter the flow of drilling liquid in the well to cause pulses at the surface to produce an appropriate signal representing the sensed downhole condition.

Referring to FIG. 1, a well 10 is drilled into the earth with a rotary drilling rig 12, which includes the usual derrick 14, derrick floor 16, draw works 18, hook 20, swivel 22, kelly joint 24, a rotary table 26, and a drillstring 28 that includes conventional drill pipe 30 secured to the lower end of the kelly joint 24 and to the upper end of a section of drill collars 32, which carries a drill bit 34. Drilling liquid (or mud, as it is commonly called in the field) is circulated from a mud pit 36 through a mud pump 38, a desurger 40, a mud supply line 41, and into the swivel 22. The drilling mud flows down through the kelly joint, drillstring and drill collars, and out through jets (not shown) in the lower face of the drill bit. The drilling mud flows back up through the annular space between the outer diameter of the drillstring and the well bore to the surface, where it is returned to the mud pit through a mud return line 42. The usual shaker screen for separating formation cuttings from the drilling mud before it returns to the mud pit is not shown.

A transducer 44 mounted in mud supply line 41 detects variations in drilling mud pressure at the surface. The transducer generates electrical signals responsive to drilling mud pressure variations, and these signals are transmitted by an electrical conductor 46 to a surface electronic processing system 48, the operation of which s described below in detail with respect to FIG. 4.

Referring to FIG. 2, an elongated logging tool 50 is located within the drill collar nearest the drill bit. The logging tool includes one or more logging transducers for sensing downhole conditions, and a pressure pulse generator for imparting pressure pulses to the drilling liquid. Ordinarily, the logging tool is provided with sensors or transducers to measure a number of downhole conditions, such as natural gamma ray count of the earth formations, torque at the bit, weight on the bit, drilling liquid pressure inside and outside the drillstring, temperature of the drilling liquid inside and outside of the drillstring, electrical resistivity of the adjacent earth formation, inclination and azimuth of the well bore, tool face bearing, tool temperature, drill bit rpm, and drilling liquid flow rate.

As shown best in FIG. 2, the logging tool 50 includes a mud turbine 54 for extracting some energy from the flowing drilling liquid and a generator 56 for converting the rotational energy of the turbine 54 into electrical energy to supply the power needs of the subsurface components in the logging tool. The turbine and generator are stabilized inside the drill collar by conventional wings or spiders 58. A mud pulser 60 is supplied power from the generator and is designed to release drilling liquid from inside the drill collar to the annular space between the drill collar outside diameter and well bore on command. This is accomplished by changing the state of a pulser valve 62 to allow drilling fluid to vent through an orifice 64 extending through the drill collar wall. Thus, when the valve is opened, a portion of the drilling liquid is bypassed around the pressure drop normally imposed on the flowing drilling liquid by the jets (not shown) in the drill bit. This causes the mud pressure at the surface to decrease below its normal operating value. When the valve is closed, the drilling liquid pressure at the surface is restored to its normal condition. Thus, opening and closing the valve creates a negative pressure pulse at the surface. The pulsing valve and its associated driving equipment may be of any suitable type which will cause a pressure pulse in the drilling liquid of sufficient amplitude for detection at the surface. A suitable mud pulsing valve for use in carrying out the present invention is disclosed in U.S. Pat. No. 4,351,037 to Scherbatskoy (1982). Another system which may be used for generating pressure pulses in drilling fluid is shown in U.S. Pat. No. 4,078,620 to Westlake et al (1978). If positive pulsing is desired, the pulser unit may be of the type disclosed in U.S. Pat. No. 2,925,251 to Arps (1960) or U.S. Pat. No. 3,958,217 to Spinnler (1976).

A subsurface electronic system 67 for processing and storing data is mounted in an elongated, sealed pressure barrel or electronics housing 68 coaxially disposed with the drill collar adjacent the drill bit. The central portion of the housing includes a mounting block 69 with outwardly extending wings 70 bolted against the inside wall of the drill collar by bolts 71 extending through the drill collar wall and into threaded openings 72 in the mounting block wings (FIG. 3). The wings are shaped to let drilling fluid flow freely past them. The upper end of the housing is mechanically connected to the lower end of the mud pulser 60. The subsurface electronics are electrically connected to the generator, as described below with reference to FIG. 4.

Electrical connection to the subsurface electronic system when the logging tool is brought to the surface of the earth can be quickly made through an electrical connector socket 80 mounted in a stepped bore 82 (FIG. 3) extending through the drill collar wall. The bore 82 is of increased diameter at its outer end to form an outwardly facing shoulder 84, which receives a disc or cover 86 held in place by a C-shaped snap ring 88 mounted in an inwardly facing annular groove 90 in the larger portion of the stepped bore 82. The cover protects the electrical connection when the logging tool is downhole. When the logging tool is physically accessible, and not submerged in drilling fluid, the snap ring and cover may be removed to allow quick connection to the electrical connector 80.

Referring to FIG. 4, the subsurface electronic system in the pressure barrel includes a conventional microprocessor 100, which performs functions and makes decisions and computations according to a predetermined sequence controlled by a computer program maintained in a read only memory (ROM) 102 to aid the microprocessor in its operations. An erasable random access memory (RAM) 104 serves as a "scratch pad" memory for the microprocessor. The computer program causes the microprocessor to take certain measurements by connecting specific sensor inputs to a multiplexed analog/digital converter 106. Typical sensor inputs are shown under reference numeral 108. The sensors are mounted within the drillstring for sensing internal conditions. Such sensors are well known to those skilled in the art.

The microprocessor is also connected to a first subsurface real-time clock 109, which allows the microprocessor to perform its functions in relation to time. The microprocessor is also connected to a pulser control interface 110, which allows the microprocessor to control the operation of the pulser valve 62 (FIG. 2). The microprocessor is also connected to a bulk nonvolatile storage memory 112 and to a subsurface external interface 114, the output of which is connected to electrical connector 80 for quick communication with the surface electronic processing system 48. This communication can be effected only when the subsurface assembly is physically accessible and not submerged in the drilling liquid. The signals stored in the nonvolatile storage memory are correlated with time by the subsurface real-time clock.

Electrical power is supplied by an uninterruptible power supply 116 connected to a bus 118, which supplies power to and interconnects the microprocessor, the random access memory, the read only memory, the multiplexed analog/digital converter, real-time clock, the pulse control interface, the bulk nonvolatile storage memory, and the subsurface external interface. The power supply 116 includes batteries (not shown) so the logging tool can continue to sense downhole conditions and store them in the bulk nonvolatile memory, even when the flow of drilling liquid is stopped.

Still referring to FIG. 4, which also shows the presently preferred embodiment of the surface electronic processing system, the transducer 44 in the mud supply line 41 detects the disturbances in the drilling liquid system caused by the operation of the pulser valve. Such disturbances are thus transduced into one or more electrical voltage or current signals, which are fed through the conductor 46 to a signal conditioner 120, which permits operations, such as buffering, filtering, and calibrating, to be performed on the incoming signal.

To keep a permanent visible record of the conditioned pressure signals, a strip-chart recorder 122 is connected to the output of the signal conditioner. That output is also connected to the input of a detector/decoder assembly 124, which extracts the digital information from the conditioned signals and decodes from this the downhole values being transmitted from the well borehole.

An analog/digital readout means 126, connected to the output of the detector/decoder, is used to display that information, if desired. In addition, the real-time signals corresponding to the value of the sensed downhole conditions are fed into a surface data processing system 128, which includes a conventional minicomputer, storage memory, program control (keyboard and video screen), and means for entering operating computer programs. The output of the surface data processing system is connected to a display 130, such as a printer, plotter, or video screen, and to an audible alarm 131. A surface real-time clock 132 is connected to the surface data processing system for time-dependent functions and for correlating stored data retrieved from the subsurface assembly when it is in an accessible location. This data retrieval is performed by a surface external interface 134, which has a plug 136 adapted to make a quick connection with electrical connector 80 when the logging tool subsurface assembly is brought to the derrick floor.

Returning to FIG. 3, the electrical connector socket 80 connects at its inner end through conventional wiring (not shown) to wiring (not shown) disposed in a longitudinal wireway 140 (FIG. 3) in the electronics housing. A magnetometer 142 is mounted substantially on the longitudinal axis of the bottom hole assembly in a transverse bore 144 formed in the mounting block. A removable plug 146 seals the outer end of bore 144 to protect the magnetometer when the bottom hole assembly is in the well. The magnetometer is mounted transversely to the bottom hole assembly longitudinal axis to sense rotational displacement and velocity of the drillstring. The magnetometer is connected by conventional wiring (not shown in detail) to the subsurface electronics system, as described in more detail below with respect to FIG. 4. The magnetometer may be conventional, such as the 3-axis fluxgate Model 106850 supplied by Develco Corporation. The output of the magnetometer is the rotation sensor output of the subsurface electronic processing system shown in FIG. 4.

First, second, and third accelerometers 148, 149, and 150, respectively, are each mounted in bores 151, 152, and 153, respectively, in the mounting block. The accelerometers may be conventional, such as Entran Devices Inc.'s Model EGAX100. A separate, respective removable plug 154 is sealed in the outer end of each of bores 151, 152, and 153 to protect the accelerometers mounted in them when the bottom hole assembly is lowered into the well. Each accelerometer is connected to the subsurface electronics by conventional wiring, as described in more detail below. The first accelerometer 148 is mounted to be responsive to acceleration in a direction perpendicular to the longitudinal axis (x axis) of the bottom hole assembly. The second accelerometer 149 is mounted to be responsive to acceleration in a direction substantially parallel to the longitudinal axis (z axis) of the bottom hole assembly, and the third accelerometer 150 is mounted to be responsive to acceleration normal (y axes) to the axes of sensitivity of the other two accelerometers. Thus, the three accelerometers are orthogonally mounted, i.e., mounted so that each axis of sensitivity is perpendicular to each of the other two axes of sensitivity.

Returning to FIG. 4, the part of subsurface electronic system for detecting, analyzing, recording, and using downhole vibration data in accordance with this invention includes a microcontroller 200, which may be conventional, such as the 8/16-bit NEC 78ClO microcontroller with its own "scratch pad" 201. A 32 K read only memory (ROM) 202 programs the microcontroller. The system also includes a random access memory (BRAM) 204 used for storage of computed or raw data. Power from uninterruptible supply 116 retains the memory of the BRAM 204 until the data is recovered at the surface. Since the BRAM 204 may be required to store relatively larger amounts of data, it has a fairly large memory, such as one megabyte. The BRAM 204 also includes a buffer section 206 for temporary storage of data which is compared with data already stored to determine whether the data in the buffer should be permanently stored or discarded. An interrupt controller 207 is connected to bus 118 to receive alarm signals from the microcontroller and cause the microprocessor to defer whatever else it may be doing, and send a coded alarm signal to the surface to actuate the audible alarm 131, as described below.

As shown in FIG. 4, the output of generator 56 passes through a voltage regulator 210 to an interruptible power supply 212, which is connected to the bus 118. As indicated previously, turbine 54 (FIG. 2) turns the generator as drilling fluid flows down through the drillstring. With this arrangement, coded signals can be sent from the surface to the bottom hole assembly for acquiring data under controlled conditions. For example, if a drilling operator wants to determine the effect of certain drilling conditions on the vibration of a particular bottom hole assembly, he can alter the flow rate of drilling fluid and also vary the rotation rate of the drillstring in a code sequence. After the downhole detection of this sequence (by sensing the drop and/or increase in voltage from the generator, in combination with changes in the rotation (magnetometer) sensor output), and a preset time delay, the BRAM 204 collects and stores a frame of data in the memory. This method allows the drilling operator to record the magnitude and frequency of vibration of the bottom hole assembly for different combinations of specific drilling parameters.

The practice of the invention will now be explained with reference to data acquired under various drilling conditions.

The downhole microprocessor is programmed to collect continuously data one frame at a time. A frame is a digitized sequence of sensor data taken over a specific time interval.

The frame duration and sampling rate are selected before each run. For example, the sampling of data can be taken at a rate as low as desired, or as high as 2000 samples per second. The fast-sampled data frame were recorded using either one of two following different triggering methods.

1. Severity-Triggered Vibration Recording Replacement Mode

Frames of the most significant or severe vibrations were detected and stored in the BRAM 204. The criterion used in determining significance for storing was defined by the following first order expression, in which a frame of n data points having instantaneous acceleration values ($A_i$) and a mean (A):

$$\text{Vibration Severity} = \Sigma \frac{|A_i - \overline{A}|}{n}$$

With this triggering method, a frame is recorded whenever the vibration value determined by the preceding algorithm exceeds a selected amount. For example, if the operator is interested in analyzing vibration whenever lateral vibration of the bottom hole assembly exceeds, say, 5 meters per second per second, and all such frames will be recorded for subsequent analysis when the data is retrieved at the surface.

Moreover, the microcontroller 200 is programmed so that if the vibration indicated by any selected accelerometer exceeds a previously-set safe value, the microcontroller activates interrupt controller 207 to instruct the microprocessor 100 to interrupt whatever measuring-whiledrilling data it may be sending to the surface, and immediately send an encoded alarm signal to the surface, which may appear on the printer, plotter, or video screen 130, or sound the audible alarm 131. The driller is then immediately alerted to an approaching dangerous or critical condition so he can alter drilling operations to keep vibration below an acceptable value. For example, the driller may alter speed of the rotary table, weight-on-bit, pumping rate of the mud pump, or the like, until the vibration is reduced to an acceptable level. Ideally, the driller uses the system of this invention to drill with minimum vibration commensurate with an acceptable drilling rate or rate of penetration (ROP). In this way, drilling operations (whether or not any relatively delicate measuring-while-drilling equipment is downhole) can continue uninterrupted for long periods of time, providing an optimum rate of penetration.

2. Surface-Triggered Downhole Vibration Recording

The downhole vibration monitoring system of this invention can also be programmed to detect an encoded sequence of flow rates and rotational speeds, which are programmed into downhole electronics system before the bit run. After the downhole system detects the encoded sequence, and a preset time delay, the system automatically collects and stores a frame of data in the memory. This method allows the drilling operator to record the magnitude and frequency of vibration of the bottom hole assembly for different combinations of specific drilling parameters.

Each of the above methods 1 and 2 provide detailed information about specific levels of vibration which occur during a selected interval of a bit run. To collect information about vibration levels during an entire bit run, data-averaging was employed, as outlined below.

CONTINUOUS BOTTOM HOLE ASSEMBLY VIBRATION LOG

To retain a record of all data, regardless of severity, each frame was processed using the following two averaging algorithms:

1. Root Means Square $$RMS = \Sigma \left[ \frac{|A_i - \overline{A}|^2}{n} \right]^{1/2}$$

2. Root Mean Cube $$RMC = \Sigma \left[ \frac{|A_i - \overline{A}|^3}{n} \right]^{1/3}$$

The values calculated by the RMS and RMC algorithms are stored in memory, thus providing a digitally averaged, fast-sampled vibration log for all three axes of the bottom hole assembly during an entire bit run.

CASE STUDIES

Case Study No. 1:

Vibration Levels While Reaming

The vibration monitoring system of this invention was placed above a roller cone bit in the bottom hole assembly. The equipment logged from 7300 feet (2230 meters) to 9700 feet (2960 meters) in 160 hours. The vibration monitoring system sampled each of the three accelerometers and the magnetometer at the rate of 800 samples per second. The computer was programmed to record the 35 most severe 5-second data frames. After the first 35 frames were recorded, each subsequent frame of greater severity than one previously recorded replaced the previously-recorded frame of least severity. Retrieved data revealed that the most severe vibration occurred while reaming. The magnetometer data clearly indicated that the drillstring underwent rapid changes in rotational velocity, i.e., significant rotational acceleration. The magnitudes of the lateral and axial accelerations were affected by those changes in rotational velocity. When the drillstring experienced the most change in rotational velocity, the peak lateral acceleration was 130 m/s$^2$ (13 G), and the peak axial acceleration was 25 m/s$^2$ (2.5 G). When the drillstring rotated at constant velocity, the peak lateral acceleration was less than 5 m/s$^2$ (0.5 G), and the axial acceleration was less than 1 m/s$^2$ (0.1 G). These changes in rotational velocity and lateral and longitudinal accelerations occurred within 5-second time frames.

Case Study No. 2:

Vibration Observations Behind Positive Displacement Downhole Motor

The vibration monitoring system was located above a bent sub with a positive displacement mud motor and a PDC bit. The system was programmed to record the 30 most severe 5-second events, as described for Case Study No. 1. In addition, the system was programmed to record the average RMS and RMC magnitude of acceleration every 30 seconds. The three orthogonal accelerometers and the rotational magnetometer were each sampled at 800 data points per second. This bottom hole assembly drilled from 8100 feet (2470 meters) to 11,000 feet (3350 meters) in 105 hours.

Retrieved data showed that the most severe vibration occurred while the measuring-while-drilling system underwent a telemetry test inside the casing, and lasted for the duration of the test (at a depth of 2000 feet). The drill pipe was stationary, while the bit speed was approximately 160 rpm. The longitudinal accelerations during this time were predominantly 200 Hz sinusoidal oscillations with a peak magnitude of 14 m/s$^2$ (1.5 G). The lateral accelerations were primarily 20 Hz sinusoidal oscillations with peak magnitudes of about 20 m/s$^2$ (2 G). This high-frequency, periodic acceleration was not observed on any other run, and was not observed while drilling on bottom with this assembly. Moreover, the vibration log data revealed only moderate vibration for the remainder of the run.

Case Study No. 3:

Drill Collar Vibration While Drilling Through Casing Shoe

The vibration monitoring system was located above a 12.25" roller cone bit on an 8" drill collar in the bottom hole assembly. The three accelerometers were each sampled at 2000 samples per second. The system logged vibration from approximately 4000 feet to approximately 8000 feet in 170 hours.

The data revealed some of the largest peak accelerations recorded to date with the system. Large lateral accelerations occurred while drilling through a 20" casing shoe. Peak magnitudes of lateral acceleration were greater than 245 m/s$^2$ (25 G). However, the magnitude of the longitudinal acceleration was less than 2 m/s$^2$ (0.2 G). To determine if there was sufficient displacement of the 8"-drill collar to make contact with the inside wall of the 20" casing shoe, the accelerations were twice integrated and transposed to the plane perpendicular to the longitudinal axis of the bottom hole assembly. The integration showed bottom hole assembly displacements of between 2 and 6 inches, i.e., large enough to cause the assembly to impact the casting wall.

Case Study No. 4:

Measurement of Destructive Vibrations

The system measured average levels of bottom hole assembly accelerations at approximately 12,000 feet, while running behind a diamond bit (IADC Code D2R2) in the Gulf of Mexico. Sustained high levels of lateral acceleration caused failure of the measuring-while-drilling resistivity and gamma ray sensors. The 289 feet of data for this example represent 26 hours of on-bottom data collected during the bit run.

The bottom hole assembly used included an $8\frac{1}{2}''$ bit, and the borehole drift varied between 0.5° to 1.5°. Lithology consisted of shales, siltstones, and thinly-bedded sandstones. The section became increasingly silty and sandy after 119 feet into the run. After the run, the bit was graded as nominally worn.

The y axis accelerometer failed 134 feet into the run. Later analysis indicated that the failure was due to sustained peak accelerations beyond the limits of the accelerometer specifications (100 G). Frames of continuous time data were not obtained during this run. Therefore, information on peak magnitude and acceleration frequencies were unavailable.

Average low-level RMC lateral acceleration along the x axis was approximately 77 m/s$^2$ (7.9 G) during the bit run. This average value was sharply exceeded during 5.85 hours, or 73 feet, of the run with an average high-level RMC acceleration of 262 m/s$^2$ (26 G). The level of measured lateral accelerations were between 3 and 23 times greater than those in the axial direction. The relationship between the lateral and longitudinal accelerations is apparently exponential. An additional point worth noting is that a measuring-while-drilling short-normal resistivity sensor mounted on the bottom hole assembly sustained vibration damage and failed shortly after the bottom hole assembly experienced a high RMC lateral acceleration of about 26 G.

The bottom hole assembly also experienced a sudden increase of lateral accelerations about 119 feet into the bit run, which corresponded to a change in lithology from predominantly shale to interbedded siltstone and sandstone, as shown by both a gamma ray log and cuttings lithology for that interval. A subsequent wireline caliper showed an enlarged hole section in this interval (16" versus 8.5"), which correlates with the predominantly shale lithology. Comparison between the borehole-corrected measuring-while-drilling gamma ray log and a later wireline gamma ray log indicated that the enlargement occurred after the section was drill, and, therefore, the lateral vibrations were not affected by an unconstrained bottom hole assembly in an enlarged borehole.

To investigate the relationship between surface-measured weight-on-bit (WOB), revolutions per minute (rpm) of the drillstring, and average levels of lateral acceleration (as determined by RMC algorithm), a second-order polynomial equation was fitted to a standardized data set using multiple regression. This regression yielded a correlation coefficient (R) of 0.74, which indicates a relatively high degree of correlation. The fitted equation was contoured with raw data points, as shown in FIG. 5, which reveals the rmp and WOB combinations which would cause the most destructive vibration for this particular bottom hole assembly drilling in this particular formation. The area of relatively low lateral accelerations between 125 and 135 rpm of the drillstring represents a good operational range for the particular bottom hole assembly, and indicates that drilling rate (rate of penetration) could be significantly improved in this rpm range without objectionable increase in vibration by merely increasing weight-on-bit from about 15,000 pounds to about 18,000 pounds. In fact, the data plotted in FIG. 5 indicates that the weight-on-bit could be increased to more than 30,000 pounds without exceeding a lateral acceleration of more than about 10 G. On the other hand, if drillstring rpm is in the range of 140–145, more severe vibration would be encountered with weight-on-bit at 15,000 pounds, and vibration would increase rapidly as WOB is increased at that rpm range.

In summary, the downhole vibration monitoring system of this invention provides information on the average (RMS and RMC) levels of bottom hole acceleration for the duration of a bit run. It can also provide detailed information on the most severe vibrations encountered during a run, and additionally, detailed information may be collected on request from the surface. Furthermore, this system automatically sends to the surface, on a high-priority basis, an encoded alarm signal to avoid destructive vibration.

We claim:

1. Apparatus for monitoring vibration of a bottom hole assembly secured to the lower end of a drillstring used to drill a well, the apparatus comprising:

at least one accelerometer mounted in the bottom hole assembly to generate data in the form of electrical signals corresponding to the acceleration experienced by the bottom hole assembly;

a computer mounted in the assembly and programmed to collect data from the accelerometer, digitally average and compute magnitude of the assembly acceleration; and a non-volatile bulk storage memory connected to the computer;

means for storing collected data in the memory;

a buffer for temporarily storing collected data;

means for comparing the value of data stored in the buffer with the value of data stored in the memory;

means for replacing data in the memory with data in the buffer when the buffer data exceeds the level of the data in memory; and means for comparing data stored in the buffer with a preset level.

2. Apparatus according to claim 1 which includes means for collecting data from the accelerometer at the rate up to about 2000 times per second.

3. Apparatus according to claim 1 or 2 which includes means for sending to the surface a signal corresponding to the value of the data in the buffer when the value exceeds the preset level.

4. Apparatus according to claim 3 which includes alarm means at the surface, and means for actuating the alarm in response to the signal sent to the surface.

5. Apparatus according to claim 3 which includes means for recovering stored data from the memory when the bottom hole assembly is moved to the surface.

6. Apparatus according to claim 1 or 2 in which the computer includes a real-time clock and means for computing the magnitude of the assembly acceleration versus real-time.

7. Apparatus according to claim 1 or 2 in which the apparatus includes three orthogonally mounted accelerometers in the assembly, and the computer is programmed to collect data from each of them.

8. Apparatus according to claim 7 in which the assembly includes a magnetometer mounted to be responsive to the earth's magnetic field and generate signals indicating rotational speed of the bottom hole assembly.

9. Apparatus according to claim 1 which includes means for causing buffered data of one value to displace data of a lower value previously stored in the memory.

10. Apparatus according to claim 1 which includes means in the assembly responsive to signals generated by encoding altered flow rate of a drilling fluid and rotational rate of the drill string from the surface for causing the computer to collect and record data from selected accelerometers for a fixed period of time.

11. Apparatus for monitoring vibration of a bottom hole assembly secured to the lower end of a drillstring used to drill a well, the apparatus comprising:
- at least one accelerometer mounted in the bottom hole assembly to generate data in the form of electrical signals corresponding to the acceleration experienced by the bottom hole assembly;
- a computer mounted in the assembly and programmed to collect data from the accelerometer and compute magnitude of the assembly acceleration;
- means downhole for processing selected data in accordance with any or all of the following algorithms:

$$\Sigma \frac{|A_i - \overline{A}|}{n} \quad (1)$$

$$\Sigma \left[ \frac{|A_i - \overline{A}|^2}{n} \right]^{\frac{1}{2}} \quad (2)$$

$$\Sigma \left[ \frac{|A_i - \overline{A}|^3}{n} \right]^{\frac{1}{3}} \quad (3)$$

where A is the instantaneous value of acceleration for n, data points having a mean value of $\overline{A}$, and means for selecting from the collected data a value which exceeds a present level.

12. Apparatus according to claim 11 which includes means for collecting data from the accelerometer at the rate up to about 2,000 times per second.

* * * * *

UNITED STATES PATENT AND TRADEMARK OFFICE
CERTIFICATE OF CORRECTION

PATENT NO.   :   4,903,245
DATED        :   February 20, 1990
INVENTOR(S)  :   D. A. Close; S. C. Owens; T. K. C. Pugh It is certified that error appears in the above-identified patent and that said Letters Patent is hereby corrected as shown below:

```
Column 1, line 12, after "vibrations" insert -- can --.
Column 1, line 29, change "drillstrigg" to
          -- drillstring --.
Column 2, line 43, change "nonvolaiility" to
          -- nonvolatility --.
Column 3, line 10, change "Ai" to -- A_i --.
Column 4, line 45, before "described" change "s" to
          -- is --.
Column 7, line 50, change "C1O" to -- C10--.
Column 8, line 62, change "measure-whiledrilling" to
          -- measure-while-drilling --.
Column 14, line 20, change "present" to -- preset --.
```

Signed and Sealed this

Fourteenth Day of January, 1992

*Attest:*

HARRY F. MANBECK, JR.

*Attesting Officer*       *Commissioner of Patents and Trademarks*